United States Patent [19]

Strothers

[11] Patent Number: 4,509,798
[45] Date of Patent: Apr. 9, 1985

[54] VEHICLE SEAT HARNESS

[76] Inventor: John Strothers, 175 W. 137th St., New York, N.Y. 10030

[21] Appl. No.: 411,086

[22] Filed: Aug. 23, 1982

[51] Int. Cl.³ .......................................... B60R 21/10
[52] U.S. Cl. .................................... 297/487; 297/469
[58] Field of Search ............... 297/469, 487, 488, 216; 200/61.58 B; 280/802

[56] References Cited

U.S. PATENT DOCUMENTS

| | | | |
|---|---|---|---|
| 2,337,480 | 12/1943 | Logan | 297/487 X |
| 3,453,026 | 7/1969 | Paes et al. | 297/487 |
| 3,863,209 | 1/1975 | Hollins | 200/61.58 B X |
| 3,899,042 | 8/1975 | Bonar | 297/487 |

Primary Examiner—William E. Lyddane
Assistant Examiner—Peter R. Brown
Attorney, Agent, or Firm—Steinberg & Raskin

[57] ABSTRACT

A vehicle seat harness which is self-actuating for movement from an inoperative position wherein it is situated to allow unobstructed access to the seat and an operating position wherein it restrains forward motion of the occupant, such movement being effected when the occupant is first seated. The seat harness is constructed with a pair of pivot arms hingedly mounted to the vehicle seat and a body restraining portion operatively associated with the pivot arms. An actuating mechanism is provided for moving the harness from the inoperative to the operative position.

10 Claims, 6 Drawing Figures

VEHICLE SEAT HARNESS

BACKGROUND OF THE INVENTION

This invention relates generally to vehicle seat harnesses and, more particularly, to vehicle seat harnesses of the type including a body restraining portion which is positioned in front of the occupant to restrain excessive forward motion.

Many types of restraint systems have been suggested for use in vehicles. The most prevalent type of restraint is the flexible seat belt which is normally manually positioned to encircle the occupant's waist. Such flexible seat belt systems, however, are often not used. Equipping of the vehicle with devices to assure use of such systems, such as warning buzzers and electrical cut-off devices, is costly.

Other types of restraints have also been suggested including air bags which are situated forwardly of the vehicle occupants and which are adapted to inflate upon impact of the vehicle. It would appear that such systems are not practical due to the expense involved in their installation and maintenance.

Vehicle seat harnesses have been suggested which include the use of bars which are pivotally mounted so as to be positionable in front of the vehicle occupant when in use. For example, U.S. Pat. No. 3,829,158 discloses a vehicle seat harness which includes a pair of hook-shaped members pivotally mounted on the vehicle seat so as to be movable over the occupant's body when in use. Harnesses of this type are not entirely satisfactory in that they require complicated maneuvers by the occupant in moving the same to their operative position. Moreover, such harnesses do not adequately provide for suitable adjustment to accommodate occupants of different shapes and sizes.

SUMMMARY OF THE INVENTION

Accordingly, one object of the present invention is to provide a new and improved vehicle seat harness for limiting excessive forward movement of the vehicle occupant.

Another object of the present invention is to provide a new and improved vehicle seat harness which is self-actuating whereby the harness moves to its operative position upon the occupant being seated.

Still another object of the present invention is to provide a new and improved vehicle seat harness which is adjustable so as to be capable of accommodating occupants of different shapes and sizes.

A further object of the present invention is to provide a new and improved vehicle seat harness which is economical in construction yet reliable in operation.

Briefly, in accordance with the present invention these and other objects are attained by providing a vehicle seat harness which includes a pair of pivot arms which are hingedly mounted in relation to the vehicle seat and a body restraining portion coupled to the pivot arms. In the illustrated preferred embodiment, the pivot arms are constituted by tubular members which are pivoted at respective ends to appropriate brackets fixed to the vehicle frame adjacent to the sides of the seat and the body restraining portion includes a substantially U-shaped member whose legs are telescopingly received within the tubular members. An actuating mechanism is provided for moving the harness from an inoperative position which provides free access to the seat to an operative position wherein the body restraining portion is situated forwardly of the occupant as soon as the occupant is seated. In one embodiment the actuating mechanism comprises a rack and pinion arrangement situated within the back of the seat so that when the occupant becomes seated the pressure of his weight will move the rack to rotate the pinion which is attached to a shaft whose ends are fixed to the pivot arms of the harness.

The harness is disposed in its inoperative position with the body restraining portion being situated rearwardly of the occupant and over the back of the seat so that when the occupant is seated the actuating mechanism causes the harness to automatically pivot to its operative position wherein the body restraining portion is situated so as to surround the occupant's waist to prevent excessive forward movement. Moreover, the body restraining portion can then be adjusted with respect to the pivot arms so as to accommodate the particular occupant of the vehicle. In order to free himself from the harness, the occupant moves the body restraining portion outwardly and then manually pivots the harness to its inoperative position.

DESCRIPTION OF THE DRAWINGS

A more complete appreciation of the present invention and many of the attendant advantages thereof will be readily understood by reference to the following detailed description when considered in connection with the accompanying drawings in which.

Figure 2:
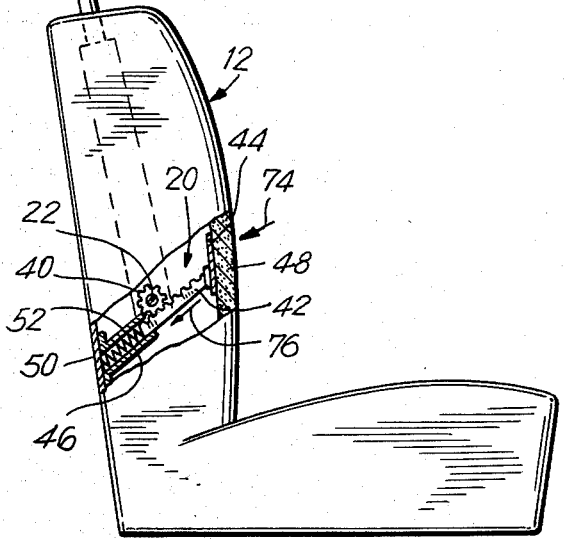
FIG. 2 is a side elevation view of the arrangement illustrated in FIG. 1 in the direction denoted by arrow 2—2 therein and partially cut away to illustrate one embodiment of an actuating mechanism.
Figure 6:
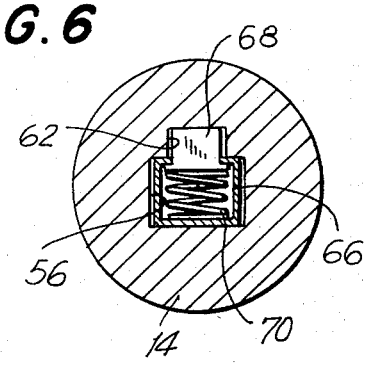
Figure 5:
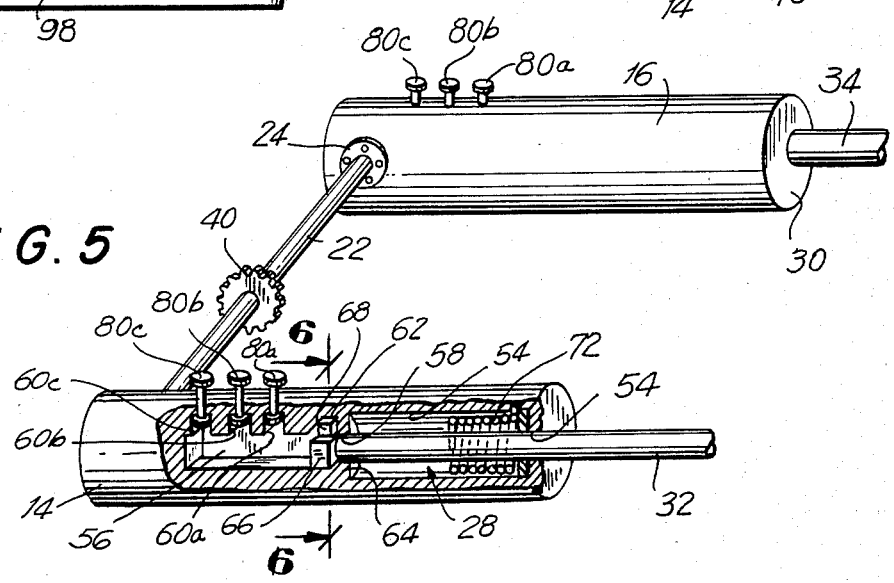

FIG. a view similar to FIG. 2 and illustrating yet another embodiment of a possible actuating mechanism;

FIG. 5 is fragmentary perspective view illustrating a vehicle seat harness in accordance with the present invention partially cut away to show one arrangement whereby the body restraining portion can be fixed in a selected position to accommodate a particular occupant; and FIG. 6 is a section view taken along line 6—6 of FIG. 5.

DESCRIPTION OF THE PREFERRED EMBODIMENTS

Referring now to the drawings wherein like reference characters designate identical or corresponding parts throughout the several views, the vehicle seat harness in accordance with the invention, generally designated 10, is adapted to automatically move from an inoperative position wherein the body restraining portion overlies the vehicle seat 12 to an operative position wherein the body restraining portion surrounds the waist of the occupant shown in phantom. Generally, the harness 10 includes a pair of pivot arms 14 and 16 hingedly mounted on suitable structure adjacent to the sides of the seat 12 so as to be pivotable around respective ends and a body restraining portion 18 having ends adjustably fixable on respective pivot arms. An actuating mechanism, generally designated 20 in FIG. 1, is incorporated within the seat 12 and functions to move the harness 10 from its inoperative position to its operative position upon sensing a pressure indicative that the occupant has been seated.

Figure 1:
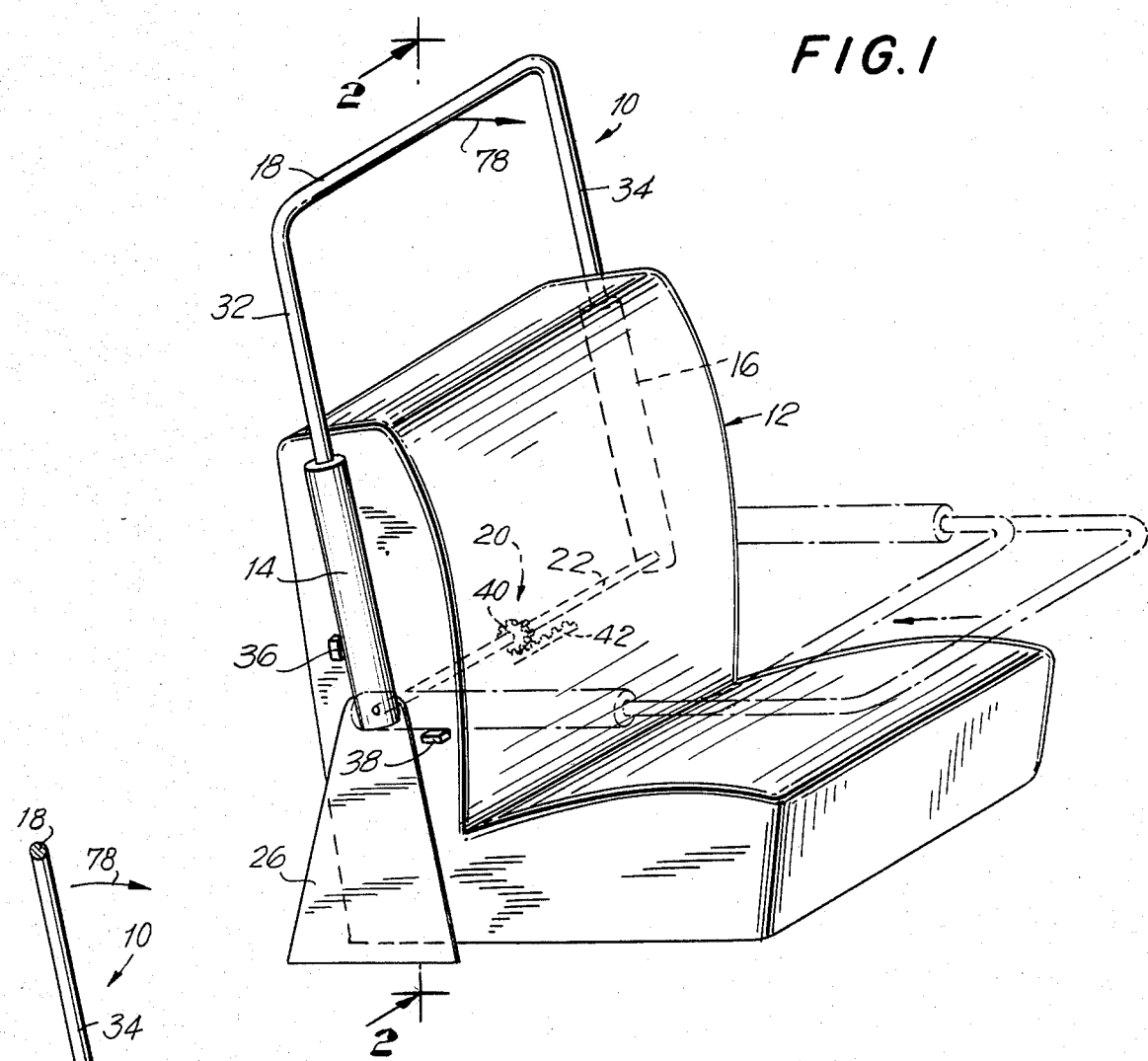
FIG. 1 is a perspective view illustrating a vehicle seat equipped with a harness in accordance with the present invention, the harness being shown in solid lines in its inoperative position and in its operative position in phantom.

Referring to FIG. 1 in conjunction with FIGS. 2 and 5, a preferred embodiment of the vehicle seat harness 10 includes a pair of pivot arms 14 and 16 in the form of tubular or cylindrical members formed of steel or the like which are interconnected at their inner ends by a shaft 22 whose ends are fixed to the respective cylindrical members by means of brackets 24 (FIG. 5). The shaft 22 passes through openings formed in a pair of mounting brackets 26 (only one shown in FIG. 1) which are themselves fixed to the frame structure of the vehicle. In this manner, the vehicle seat harness 10 is coupled to the vehicle frame in a rigid manner.

Each cylinder member 14 and 16 has an axially extending bore 28 (FIG. 5) formed therethrough opening onto the forward end 30 of the pivot arm. The body restraining portion 18 is in the form of a U-shaped member, preferably formed of steel rod stock. The end portions of the legs 32 and 34 of the body restraining portion 18 are telescopingly received within the bores 28 of the respective pivot arms 14 and 16 so as to be fixable there within at selectively adjustable positions as described in detail below.

A pair of stop members 36 and 38 (FIG. 1) are fixed to the side of seat 12 to limit the pivoting movement of the harness 10 between the inoperative and operative positions. Thus, as seen in FIG. 1, with the harness 10 in its inoperative position, the pivot arms 14 and 16 extend upwardly in a slightly rearwardly angled direction and are prevented from further rearward pivoting by means of stop member 36. The pivot arms 14 and 16 will similarly be supported by the stop member 38 when the vehicle seat harness 10 is in its operative position. It is noted that the legs 32 and 34 of the body restraining portion 18 are of sufficient length such that when the harness 10 is in its inoperative position, sufficient head room clearance can be provided so that the harness can move to its operative position without requiring the occupant to shift his position to avoid interference in any substantial manner.

According to a feature of the present invention, the harness 10 is equipped with an actuating mechanism for moving the harness from its inoperative position to its operative position upon the occupant being seated. The actuating mechanism is preferably a pressure sensitive mechanism which actuates the movement of the harness upon sensing the pressure exerted by the occupant on the seat as he is seated. In the embodiment illustrated in FIGS. 1, 2 and 5, the actuating mechanism 20 comprises a rack and pinion arrangement situated within the enclosure provided by the back of the vehicle seat 12. With particular reference to FIG. 2, the actuating mechanism 20 comprises a pinion 40 rigidly fixed to the shaft 22 and a rack 42 whose forward end is fixed to a mounting plate 44 which is appropriately fixed to the inner surface of the front wall of the seat back. The teeth of the rack 42 mesh with those of pinion 40 and as seen in FIG. 2, the rack 42 extends downwardly to the rear so as to be receivable within an upwardly and forwardly extending guide channel 46 whose rearward end is fixed to the inner surface of the rear wall of the seat back. The front and rear walls of the seat back, designated 48 and 50, are normally maintained in spaced relationship to each other by means of upholstery springs such as are conventionally utilized in vehicle seats. Moreover, a spring 52 is preferably situated within the guide channel 46 with one end bearing against the rear wall 50 and the other end bearing against the free end of rack 42 to thereby normally urge the rack 42 out of channel 46. The operation of the actuating mechanism 20 will be described below in conjunction with the operation of the harness 10.

Referring now to FIG. 5, another feature of the present invention is that the body restraining portion 18 is selectively positionable within the pivot arms 14 and 16 so as to be capable of accommodating occupant's of various sizes and shapes. In the illustrated embodiment, as noted above, the end portions of the legs 32 and 34 are telescopingly received within the bore 28 provided in each of the pivot arms 14 and 16. The bore 28 is constituted by an opening 54 formed in the front end 30 of each pivot arm, an elongate cylindrical bore portion 54 forming a spring housing and a longitudinally extending locking slot 56 which communicates with the bore portion 54 through an opening 58. The locking slot 56 is formed with a plurality of locking recesses 60a, 60b and 60c along its length and a recess 62 adjacent the wall 64 separating the bore portion 54 and locking slot 56. The rear surface of recess 62 is formed at an angle for purposes described below.

The end portions of the legs 32 and 34 of the body restraining portion 18 pass through the bore 28 of the respective pivot arms 14 and 16 and as seen in FIG. 5 have locking pin housings 66 fixed to their free ends. In construction, the pivot arms 14 and 16 may be formed from separate half portions so as to enable the positioning of the end portions of the pivot arms within the bores 28. A locking pin 68 (FIG. 6) is slidably mounted within each housing 66 and normally protrude from an opening formed therein under the force of a spring 70. Moreover, a spring 72 is located within the bore portion 54 having its forward end attached to the inner surface of the front end 30 of each pivot arm and its other end fixed to the respective leg of the body restraining portion 18. The spring 72 is normally tensioned so as to urge the respective legs 32 and 34 of body restraining portion 18 outwardly from the pivot arms 14 and 16.

The operation of this embodiment of the vehicle seat harness 10 will now be described. Prior to the occupant entering the vehicle, the vehicle harness 10 is in its inoperative position illustrated in the solid line configuration of FIG. 1. The harness 10 is maintained in this position by virtue of its extending slightly rearwardly in the upward direction so that its center of gravity is located behind the pivot points defined by the openings through brackets 26 through which the shaft 22 extends, the harness being held in this position by the stop member 36. When in its inoperative position, the body restraining portion 18 is in its advanced position, i.e., with the leg portions 32 and 34 advanced within bore 28 of the pivot arms 14 and 16 to the greatest extent possible. Thus, the locking pin housing 66 will abut against the separating wall 64 when the body restraining portion 18 is in its advanced position. In this manner, sufficient clearance will be provided when the occupant is seated for the vehicle harness 10 to pivot to its operative position without hitting the back of the occupant's head. The body restraining portion 18 is maintained in its advanced position under the force of springs 72.

As the occupant is seated, a pressure is exerted upon the front wall 48 of seat 12 in the direction indicated by arrow 74 (FIG. 2). This downward and rearward pressure causes the rack 42 to move in the direction designated by arrow 76 into the guide channel 46 against the force of spring 52 as well as against the force of the conventional upholstery springs of seat 12. This rearward movement of rack 42 causes a counter-clockwise torque to be impressed on the shaft 22 by virtue of the meshing engagement with pinion 40, the torque being sufficient to cause the vehicle harness to move in the direction indicated by arrow 78 in FIGS. 1 and 2 to at least a position wherein the center of gravity lies forwardly of the pivot points of the vehicle harness 10 whereupon the harness will fall under its own weight to the operative position shown in phantom FIG. 1 where it is held by stop members 38.

The body restraining portion 18 is then retracted by the occupant by exerting an inward force tending to telescope the end portions of legs 32 and 34 into the bore 28 of pivot arms 14 and 16. In this connection, it is seen that when the retractive force is applied to the body restraining portion 18, the pin 68 will cam against the angled surface of the recess 62 to allow rearward movement of the locking pin housing 66 rearwardly within the locking slot 56. As the locking pin 68 comes into alignment with a respective locking recess 60a, 60b, 60c the locking pins 68 will advance into the recess under the force of spring 70. For example, as the body restraining portion 18 is retracted, the pin 68 will first advance into the locking recess 60a. It is understood that such operation is identical in connection with each of the legs 32 and 34 in its corresponding pivot arms 14 and 16. Should the vehicle occupant be relatively thin so that a higher fit of the body restraining portion 18 around his waist is desired, a button 80a on each pivot arm is depressed which engages the pin 68 to depress the same to allow further retraction of the body restraining portion within the pivot arms. Suitable buttons 80a, 80b and 80c are provided which align and are situated within the respective locking recesses 60a, 60b and 60c. In this manner, the position of the body restraining portion 18 is appropriately adjusted to accommodate the particular size and shape of the occupant of the vehicle.

When the occupant desires to exit from the vehicle harness, the appropriate buttons 80 are depressed and the body restraining portion 18 advanced to its forward most position. The harness is then pivoted in a counter clockwise direction manually to its inoperative position to free the occupant.

From the foregoing, it is seen that the present invention is provided with several important features. For example, the harness 10 is self actuating so as to be movable from its inoperative position to its operative position upon the vehicle occupant being seated. The harness 10 is adjustable to accommodate vehicle occupants of different sizes and shapes. Moreover, the harness 10 is simple in construction and economical in manufacture and will provide a reliable harnessing of the occupant.

It is of course understood that the invention may be modified from the preferred embodiment discussed above. For example, the means by which the body restraining portion is selectively fixable within the pivot arms may be other than that described above. In fact, the particular structure of the pivot arms may be other than cylinder or tube members as shown. Moreover, the body restraining portion may be formed so as to include a shoulder engaging portion so that not only will the waist of the occupant be encircled thereby but, additionally, the shoulders of the occupant will be restrained against excessive forward movement.

Figure 3:
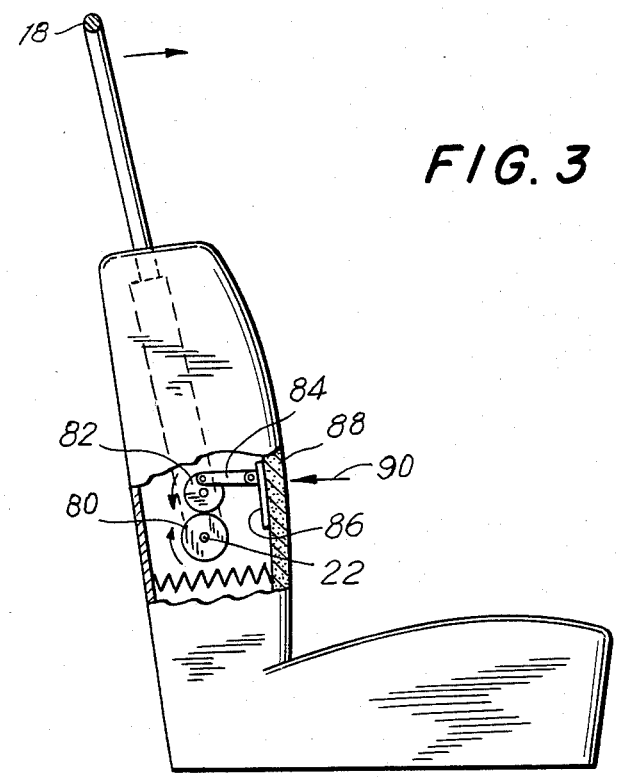
FIG. 3 is a view similar to FIG. 2 and illustrating another embodiment of an actuating mechanism.
Figure 4:
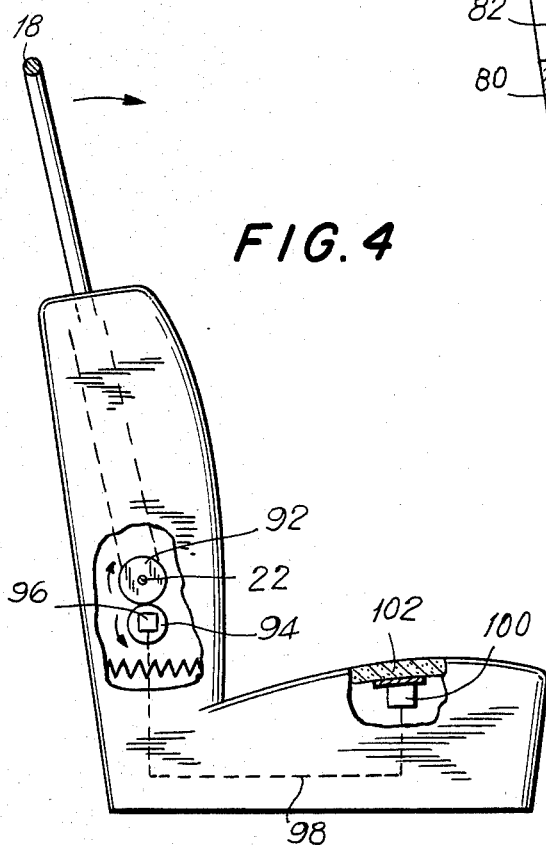

Other embodiments of the actuating mechanism for moving the harness from the inoperative to the operative position are also possible. Referring to FIG. 3, a friction wheel 80 is fixed to the shaft 22 in lieu of the pinion 40. A drive wheel 82 is mounted on its own shaft suitably fixed within the back of the seat 12 and a drive link 84 has one end pivoted to the drive wheel 82 and its other end pivoted to a mounting plate 86 fixed to the inner surface of the front wall 88 of the seat. When the vehicle occupant is seated, a force is exerted on the front wall 88 of the seat in the direction indicated by arrow 90 causing rotation of the drive wheel 82 and friction wheel 80 in the direction indicated thereby impressing a torque on the vehicle harness which will move the same toward its operative position as described above in connection with FIG. 1. In another possible embodiment illustrated in FIG. 4, a friction wheel 92 is fixed to shaft 22 and is engaged by a drive wheel 94 suitably mounted on its own shaft within the back of the vehicle seat. The drive wheel 94 is associated with a small electric motor 96 which is coupled through suitable electrical connections, designated 98, to a pressure sensitive micro-switch 100 affixed to the inner surface of the top wall 102 of the seat portion of the seat. Thus, when an occupant is seated, the pressure-sensitive micro switch 100 is closed thereby actuating the motor 96 which impresses a torque on the harness 10 through the friction wheels 92 and 94 tending to move the harness from its inoperative to its operative position as described above in connection with FIG. 1. Although several embodiments of actuating mechanisms for use in vehicle seat harnesses in accordance with the invention have been illustrated herein, it is understood that many other types of actuating mechanisms may be utilized than those illustrated herein.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A vehicle seat harness assembly for use with a vehicle seat having a seat portion and back portion extending upwardly from a rear end of the seat portion, comprising:
   a substantially U-shaped harness including a pair of pivot pivot arm portions and a body restraining portion extending between and interconnecting said pivot arm portions;
   means for hingedly mounting said harness with respect to said vehicle seat so as to be freely pivotable around a pivot axis;
   stop means for limiting the pivotal movement of said harness between an inoperative position wherein both of said pivot arm portions extend upwardly from said pivot axis and said body restraining portion is situated substantially over the back portion of the seat and wherein the center of gravity of said harness is situated above and at least slightly rearwardly of said pivot axis, and an operative position wherein both of said pivot arm portions extend forwardly of said pivot axis and said body restraining portion is situated substantially over the seat portion of the seat; and actuating means in the vehicle seat for automatically pivoting said harness when in said inoperative position, in response to a vehicle occupant sitting in the seat, from said inoperative position to a position intermediate of said inoperative and operative positions wherein the center of gravity of said harness is situated above and at least slightly forwardly of said pivot axis, so that upon said harness being pivoted to said intermediate position by said actuating means, it will continue to freely pivot under the force of gravity until reaching said operative position.

2. The combination of claim 1 wherein when said harness is in said inoperative position, said pivot arm portions extend upwardly from and at least slightly rearwardly of said pivot axis and said body restraining portion is situated over the back portion of the seat at least slightly rearwardly of said pivot axis.

3. The combination of claim 1 wherein said pivot arm portions are hingedly mounted to mounting brackets which are fixed to the frame of the vehicle.

4. The combination of claim 1 wherein said pivot arm portions comprise a pair of pivotarms and said body restraining portion comprises a member having a pair of free ends releasably affixable to respective ones of said pivot arms.

5. The combination of claim 4 wherein said pivot arms each comprise a tubular member having a longitudinally extending bore formed therein and wherein said body restraining portion comprises a substantially U-shaped member having a pair of legs, said legs having end portions telescopingly received in said bores of respective pivot arms.

6. The combination of claim 5 further including means for selectively locking said end portions of said legs at selective positions within said bores of said pivot arms.

7. The combination of claim 1 wherein said harness includes a pivot shaft interconnecting end portions of said pivot arm means and pssing through an enclosure defined within the back portion of the vehicle seat, said pivot shaft extending along said pivot axis, and wherein said actuating means comprise means for impressing a torque on said shaft.

8. The combination of claim 7 wherein said actuating means comprise a pinion affixed to said shaft, a rack mounted within said enclosure meshing with said pinion, said rack adapted to move to rotate said pinion upon the occupant being seated to exert a pressure on the seat back portion.

9. The combination of claim 7 wherein said actuating means comprise a friction wheel affixed to said shaft, a rotatably mounted drive wheel engaging said friction wheel and a linkage interconnecting said drive wheel and the vehicle seat whereby said friction wheel is rotated upon the occupant being seated to exert a pressure on the seat back portion.

10. The combination of claim 7 wherein said actuating means comprise electrical motor means adapted to impress a torque on said shaft and pressure-sensitive switch means mounted in said seat for actuating said motor means upon the occupant being seated to exert a pressure on the seat.

* * * * *